United States Patent
Mashal

(10) Patent No.: US 12,110,627 B2
(45) Date of Patent: Oct. 8, 2024

(54) GESTURE CONTROL METHOD AND SYSTEM FOR FLUID DISPENSING APPARATUS

(71) Applicant: Haier US Appliance Solutions, Inc., Wilmington, DE (US)

(72) Inventor: Khalid Jamal Mashal, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 311 days.

(21) Appl. No.: 17/570,467

(22) Filed: Jan. 7, 2022

(65) Prior Publication Data
US 2023/0220602 A1 Jul. 13, 2023

(51) Int. Cl.
*D06F 34/28* (2020.01)
*D06F 34/14* (2020.01)
*D06F 39/02* (2006.01)
*G06F 3/01* (2006.01)

(52) U.S. Cl.
CPC ............. *D06F 34/28* (2020.02); *D06F 34/14* (2020.02); *D06F 39/028* (2013.01); *G06F 3/017* (2013.01)

(58) Field of Classification Search
None
See application file for complete search history.

(56) References Cited

U.S. PATENT DOCUMENTS

| | | |
|---|---|---|
| 10,222,868 B2 | 3/2019 | Martinez Fernandez et al. |
| 2013/0229346 A1 | 9/2013 | Jungbauer |
| 2019/0378395 A1 | 8/2019 | Pi |

FOREIGN PATENT DOCUMENTS

| | | | |
|---|---|---|---|
| CN | 109343709 A | 2/2019 | |
| WO | WO-2018199543 A1 * | 11/2018 | ............. D06F 33/00 |
| WO | WO2019057509 A1 | 3/2019 | |

OTHER PUBLICATIONS

WO 2018199543 A1 translation, Kwon, Clothing Processing Apparatus, Control Method of Clothing Processing Apparatus, and Online System Including Clothing Processing Apparatus (Year: 2018).*

* cited by examiner

*Primary Examiner* — Cristi J Tate-Sims
(74) *Attorney, Agent, or Firm* — Dority & Manning, P.A.

(57) ABSTRACT

An appliance, a controller, and a method for dispensing fluid are provided. The appliance including a fluid station configured to dispense water, cleaning agent, or a combination thereof, and a signal receiver device configured to receive signals from a user. A controller is operably coupled to the signal receiver device. The controller is configured to detect, via the signal receiver device, a gesture signal corresponding to a desired operating mode of the appliance, and command a function at the washing machine appliance based on the gesture signal.

20 Claims, 7 Drawing Sheets

GESTURE CONTROL METHOD AND SYSTEM FOR FLUID DISPENSING APPARATUS

FIELD

The present subject matter relates generally to fluid dispensing appliances and methods for control thereof. More specifically, the present subject matter relates to washing machine appliances and control methods for fluid dispensing.

BACKGROUND

Washing machine appliances generally include a cabinet which receives a wash tub for containing water or wash fluid (e.g., water and detergent, bleach, or other wash additives). The wash tub may be suspended within the cabinet by a suspension system to allow some movement relative to the cabinet during operation. A wash basket is rotatably mounted within the wash tub and defines a wash chamber for receipt of articles for washing. A drive assembly is coupled to the wash tub and is configured to selectively rotate the wash basket within the wash tub.

Washing machine appliances are typically equipped to operate in one or more modes or cycles, such as wash, rinse, and spin cycles. Washing machine appliances are generally configured to dispense water or soap when set to operate one or more cycles. However, a user of a washing machine appliance may desire to receive water or detergent outside of the wash basket or outside of the operating modes or cycles, such as to pre-treat or soak laundry articles prior to placing the articles into the washing machine, or to utilize the washing machine appliance as an apparatus to dispense water or soap generally.

As such, a washing machine appliance, a control system, and a method for dispensing a fluid would be advantageous. Furthermore, a system and a method for dispensing a fluid from a washing machine appliance would be advantageous.

BRIEF DESCRIPTION

Advantages of the invention will be set forth in part in the following description, or may be apparent from the description, or may be learned through practice of the invention.

An aspect of the present disclosure is directed to an appliance including a fluid station configured to dispense water, cleaning agent, or a combination thereof, and a signal receiver device configured to receive signals from a user. A controller is operably coupled to the signal receiver device. The controller is configured to detect, via the signal receiver device, a gesture signal corresponding to a desired operating mode of the appliance, and command a function at the washing machine appliance based on the gesture signal.

Another aspect of the present disclosure is directed to a method for dispensing fluid from an appliance. The method includes detecting, via a signal receiver device, a gesture signal corresponding to a desired operating mode of the appliance; and commanding dispensing or discontinuance of dispensing of fluid from a fluid station based on the gesture signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
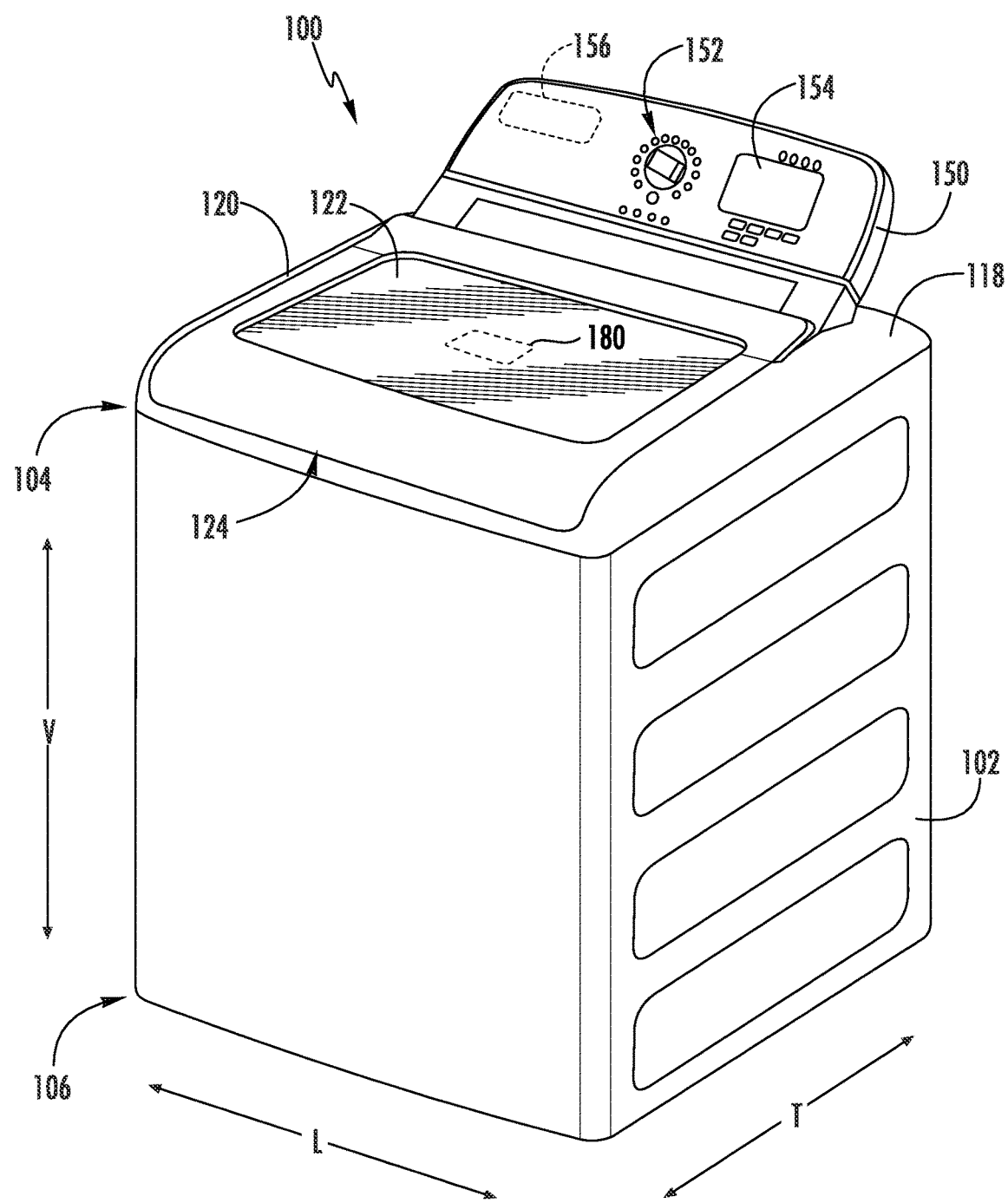
FIG. 1 provides a perspective view of an appliance according to an exemplary embodiment of the present subject matter with a door of the exemplary washing machine appliance shown in a closed position in accordance with aspects of the present disclosure.

Repeat use of reference characters in the present specification and drawings are intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

It should be appreciated that where a value is at a threshold, one skilled in the art may determine whether an action at the threshold may correspond to actions below the threshold or above the threshold. For instance, an action "below a threshold" may include values "at or below a threshold." In another instance, an action "above a threshold" may include values "at or above a threshold." One skilled in the art may alter the corresponding action of a value at or equal to a threshold without deviating from the scope of the present disclosure.

Embodiments of a control system, method, and appliance are provided. Embodiments provided herein allow for touchless control of an appliance to selectively dispense fluid, such as water or soap or detergent. Embodiments provided herein include a control device and a signal receiver device, such as a camera, microphone, light or laser sensor, or radio sensor, configured to receive gesture signals from a user corresponding to desired operating modes. The gesture signals may include hand movements, eye movements, head movements, audible signals (e.g., voice, words, grunts, glutaral, sounds, whistles, etc.), or other gestures by a user. In various embodiments, the hand movements may include sign language alphabet or numerical gestures. The gesture signal may correspond to an operating mode in which fluid is dispensed from a fluid station. The fluid station may include any dispensing device, opening, nozzle, spigot, etc. configured to release water or cleaning agent. The operating mode associated with the gesture signal may particularly differ from one or more wash, rinse, soak, or spin cycles of a washing machine appliance.

A first gesture signal may correspond to a first operating mode, such as dispensing cold water. A second gesture signal may correspond to a second operating mode, such as dispensing warm water (i.e., a mixture of cold water and hot water). A third gesture signal may correspond to a third operating mode, such as dispensing hot water. A fourth gesture signal may correspond to a fourth operating mode, such as dispensing detergent, soap, or another cleaning agent (hereinafter, "cleaning agent"). A fifth gesture signal may correspond to a fifth operating mode, such as deactivating or stopping dispensing of the cleaning agent. A sixth gesture signal may correspond to a sixth operating mode, such as deactivating dispensing of water or water/cleaning agent mixture. A seventh gesture signal may correspond to a seventh operating mode, such as one or more other functions at the appliance, such as, but not limited to, activating a drain or agitating a wash basket.

The control system may include any controller in operable communication with a signal receiver device. In one embodiment, the controller and signal receiver device are integrated with a washing machine appliance, such as to include a camera mounted to the washing machine appliance and in operable communication with the controller of the washing machine appliance to send and receive signals. In another embodiment, the controller and signal receiver device are integrated into a smartphone device, tablet device, or other computing device (hereinafter, "computing device") in operable communication with a controller of the washing machine appliance. In still various embodiments, the controller may include, at least in part, a distributed network of computing devices, such as a cloud network computer. The distributed network may include a plurality of processors and memory devices at a plurality of computing devices. Instructions may be stored at a first computing device, such as a cloud computing environment, and executed by a second computing device at the appliance. The washing machine appliance may further include a device holder configured to retain the computing device, allowing for a user to render hand gestures without holding the computing device.

In various embodiments, the washing machine appliance is configured for selectively allowing for dispensing water or soap, such as a selective dispensing mode. The selective dispensing mode may particularly dispense water or soap (hereinafter, "fluid") for an indefinite period of time until the user commands deactivation or discontinuance of the flow of fluid. Additionally, or alternatively, the selective dispensing mode may correspond to a period of time for dispensing the fluid. The period of time may be separate from one or more periods of time corresponding to a load size, load type, or water height. The period of time for dispensing the fluid may include a maximum period of time, a maximum period of time and flow rate of fluid, a maximum fluid volume dispensed, or other function of time or volume or mass flow that may mitigate overflow, flooding, or endless dispensing of fluid.

The signal receiver device is configured to detect, recognize, or otherwise receive one or more gesture signals each corresponding to one or more desired operating modes, such as described herein. The signal receiver device is configured to send a control signal to the controller at the washing machine appliance corresponding to one or more operating modes. The controller may receive the control signal and command dispensing of the fluid, discontinuance of dispensing, or another appliance function, at the washing machine appliance.

In particular embodiments, the control system may be inhibited from dispensing fluid or detecting the gesture until a control surface at the appliance is actuated. The control surface may include a lid or door of a washing machine appliance. In one embodiment, the control system and method may include receiving a permission signal at the controller allowing for detecting the gesture signal. The permission signal may correspond to an open door at the washing machine appliance. An inhibit signal may correspond to a closed door at the washing machine appliance. In other embodiments, the permission signal may correspond to detection of a vessel, receptacle, or container, at a desired location proximate to a fluid dispenser. The inhibit signal may correspond to non-detection of the vessel, receptacle, or container at the desired location.

In still particular embodiments, the controller is configured to receive the permission signal and send a notification signal to the computing device. The notification signal may open a graphical user interface (GUI), or prompt a user to open the GUI, at the computing device. The GUI is configured to detect, recognize, or otherwise receive the gesture signal via the signal receiver device. The computing device receives gesture signal corresponding to the desired operating modes and commands the appliance to operate in accordance with the received gesture signal.

Figure 2:
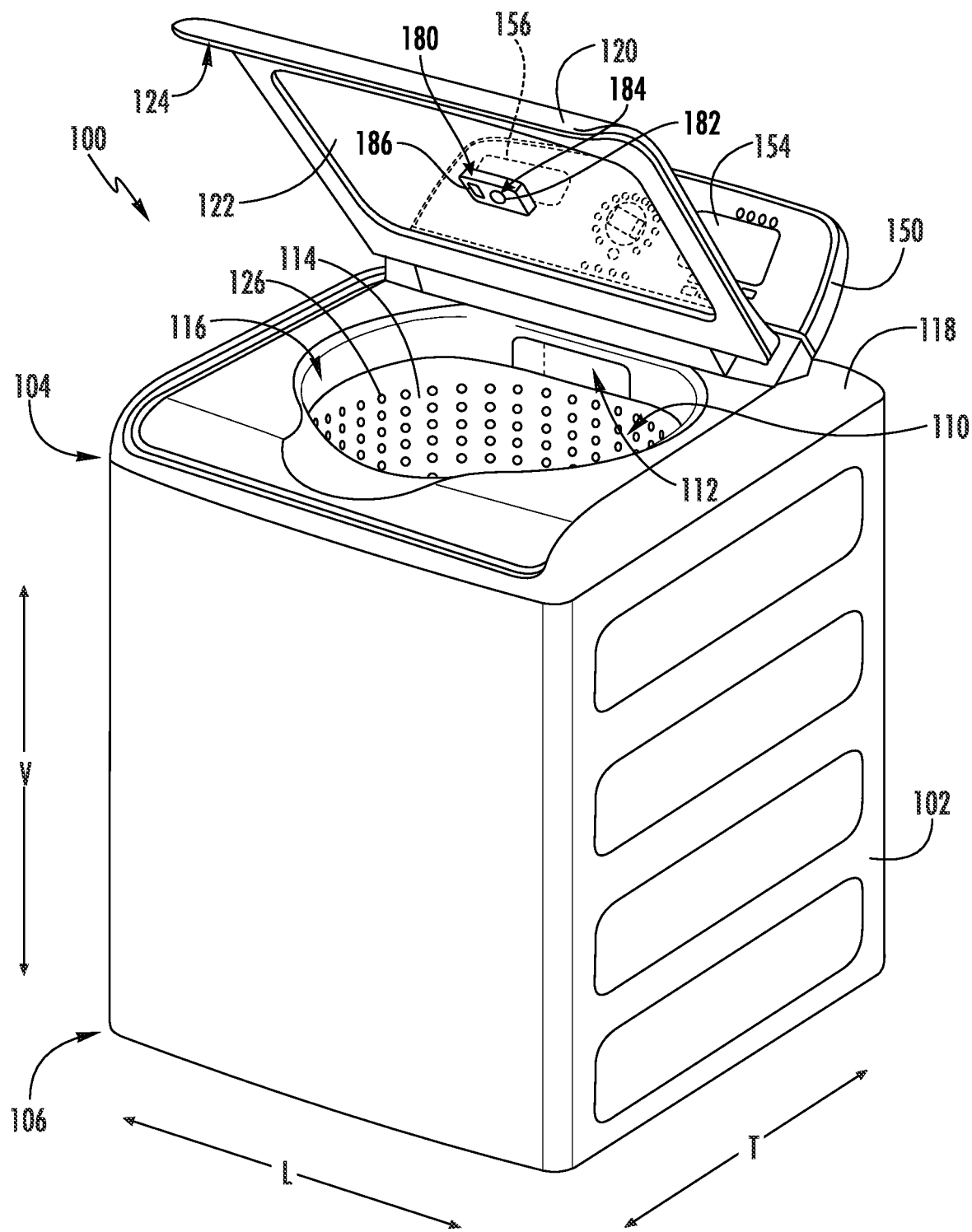
FIG. 2 provides a perspective view of the exemplary washing machine appliance of FIG. 1 with the door of the exemplary washing machine appliance shown in an open position in accordance with aspects of the present disclosure.
Figure 3:
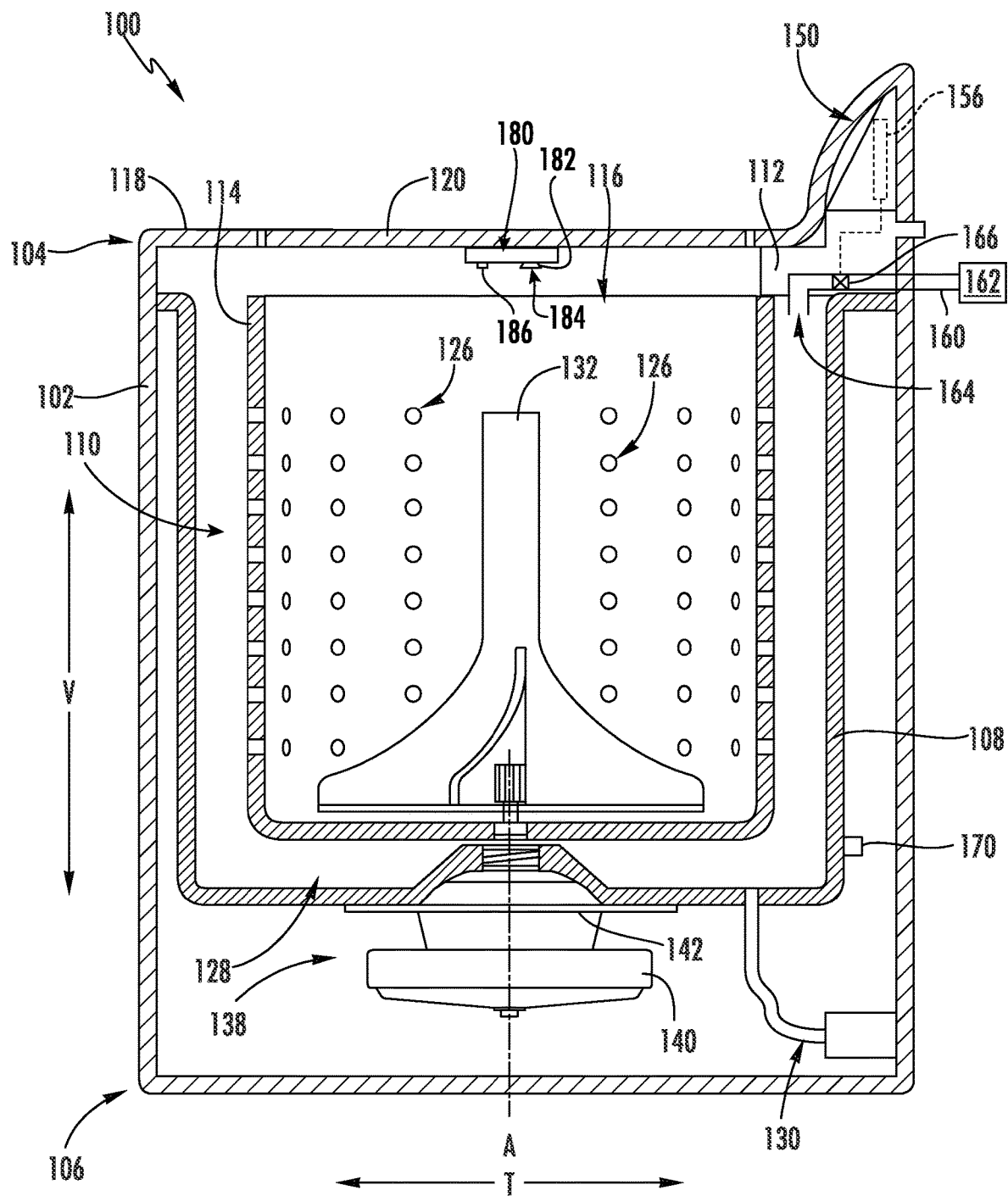
FIG. 3 provides a side cross-sectional view of the exemplary washing machine appliance of FIG. 1 in accordance with aspects of the present disclosure.

Referring now to the drawings, FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser 112 (FIG. 2) for dispensing wash fluid into wash tub 108. The term "wash fluid" refers to a liquid used for washing or rinsing articles during an operating cycle and may include any combination of water, detergent, fabric softener, bleach, and other wash additives or treatments.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly or motor assembly 138 in mechanical communication with wash basket 114 to selectively rotate wash basket 114 (e.g., during an agitation or a rinse cycle of washing machine appliance 100). In addition, motor assembly 138 may also be in mechanical communication with agitation element 132. In this manner, motor assembly 138 may be configured for selectively rotating or oscillating wash basket 114 or agitation element 132 during various operating cycles of washing machine appliance 100.

More specifically, motor assembly 138 may generally include one or more of a drive motor 140 and a transmission assembly 142, e.g., such as a clutch assembly, for engaging and disengaging wash basket 114 or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, motor assembly 138 may include any other suitable number, types, and configurations of support bearings or drive mechanisms.

Referring to FIGS. 1 through 3, washing machine appliance 100 may include a signal receiver device 180 for detecting, recognizing, or receiving gestures or gesture signals from a user, such as described herein. The signal receiver device 180 may be mounted to the cabinet 102, the door 120, or any other appropriate position at the washing machine appliance 100. The signal receiver device 180 may be configured as a camera, a laser device, a radar device, a sonar device, or other device configured to detect or receive or determine an image, such as a hand gesture, eye movement, head movement, or other gesture from the user.

The signal receiver device 180 may include a plurality of sensors 182, 184 contained in a housing 186. The signal receiver device 180 may additionally be configured to determine one or more discrete or transient speeds of rotary components of the washing machine appliance. Signal receiver device 180 may include various components for detecting a rotational speed, such as housing 186 and sensor element 182, 184. The signal receiver device 180 is configured in operable communication with controller 156, such as further described herein. In certain embodiments, the signal receiver device 180 is configured to transmit an inhibit signal or a permission signal, such as to allow detection of gestures from the user, such as further described herein.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, or other items of interest to appliance users regarding operation.

Operation of washing machine appliance 100 is controlled by a controller or processing device 156. In certain embodiments, controller 156 is operatively coupled to control panel 150 for user manipulation to select washing machine cycles and features. In response to user manipulation of control panel 150, controller 156 operates the various components of washing machine appliance 100 to execute selected machine cycles and features. The control panel 150 or controller 156 is configured in operative communication with one or more sensors, such as to receive and communicate via input and output signals, such as described herein. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

In still various embodiments, controller 156 may include, at least in part, a distributed network of computing devices, such as a cloud network computer. The distributed network may include a plurality of processors and memory devices at a plurality of computing devices. Instructions may be stored at a first computing device, such as a cloud computing environment, and executed by a second computing device at the washing machine appliance 100.

During operation of washing machine appliance 100, laundry items are loaded into wash basket 114 through opening 116, and washing operation is initiated through operator manipulation of input selectors 152. Wash basket 114 is filled with water and detergent or other fluid additives via primary dispenser 112. One or more valves can be controlled by washing machine appliance 100 to provide for filling wash tub 108 and wash basket 114 to the appropriate level for the amount of articles being washed or rinsed. By way of example for a wash mode, once wash basket 114 is properly filled with fluid, the contents of wash basket 114 can be agitated (e.g., with agitation element 132 as discussed previously) for washing of laundry items in wash basket 114.

In an embodiment, such as depicted in FIG. 3, washing machine appliance 100 includes a water supply conduit 160 that provides fluid communication between a water supply source 162 (such as a municipal water supply) and a discharge nozzle 164 for directing a flow of water into wash chamber 110. In addition, washing machine appliance 100 includes a water fill valve or water control valve 166 which is operably coupled to water supply conduit 160 and communicatively coupled to controller 156. In this manner, controller 156 may regulate the operation of water control valve 166 to regulate the amount of water within wash tub 108.

Although water supply conduit 160, water supply source 162, discharge nozzle 164, and water control valve 166 are all described and illustrated herein in the singular form, it should be appreciated that these terms may be used herein generally to describe a supply plumbing for providing hot or cold water into wash chamber 110. In this regard, water supply conduit 160 may include separate conduits for receiving hot and cold water, respectively. Similarly, water supply source 162 may include both hot- and cold-water supplies regulated by dedicated valves.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle or after the rinse cycle in order to wring wash fluid from the articles being washed. During a spin cycle, wash basket 114 is rotated at relatively high speeds to help wring fluid from the laundry articles through perforations 126. During or prior to the spin cycle, drain pump assembly 130 may operate to discharge wash fluid from wash tub 108, e.g., to an external drain. After articles disposed in wash basket 114 are cleaned or washed, the user can remove the articles from wash basket 114, e.g., by reaching into wash basket 114 through opening 116.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, or different features may also be utilized with the present subject matter as well, e.g., horizontal axis washing machine appliances. In addition, aspects of the present subject matter may be utilized in a combination washer/dryer appliance.

Figure 4:
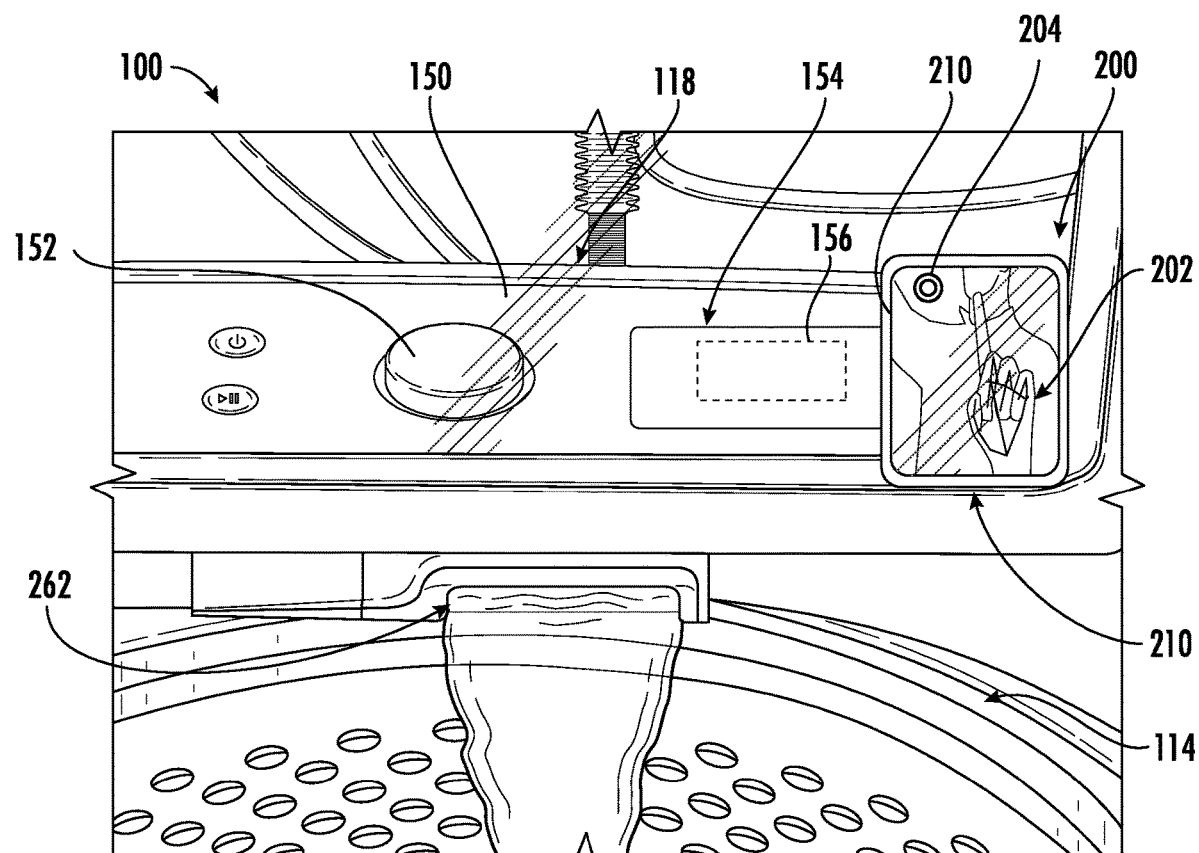
FIG. 4 provides a perspective view of a portion of an embodiment of the appliance in accordance with aspects of the present disclosure.
Figure 5:
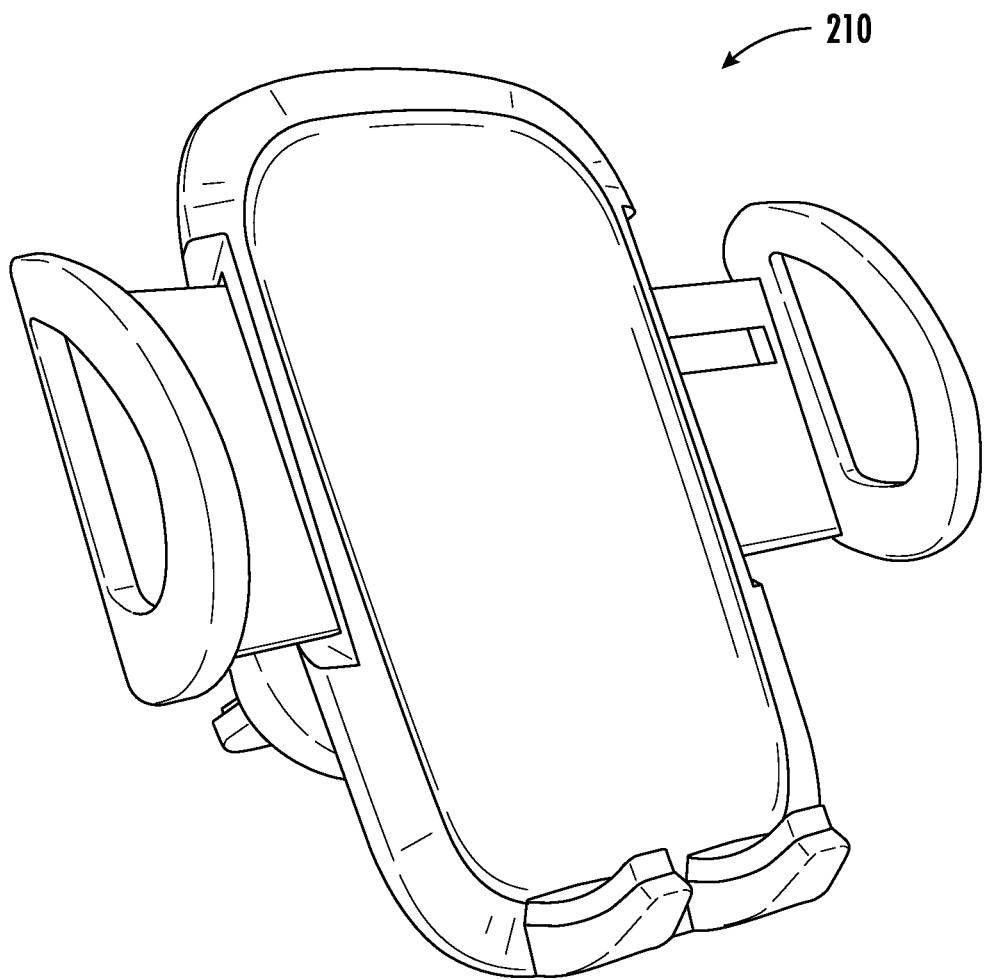
FIG. 5 provides a perspective view of an exemplary device holder of the appliance in accordance with aspects of the present disclosure.
Figure 6:
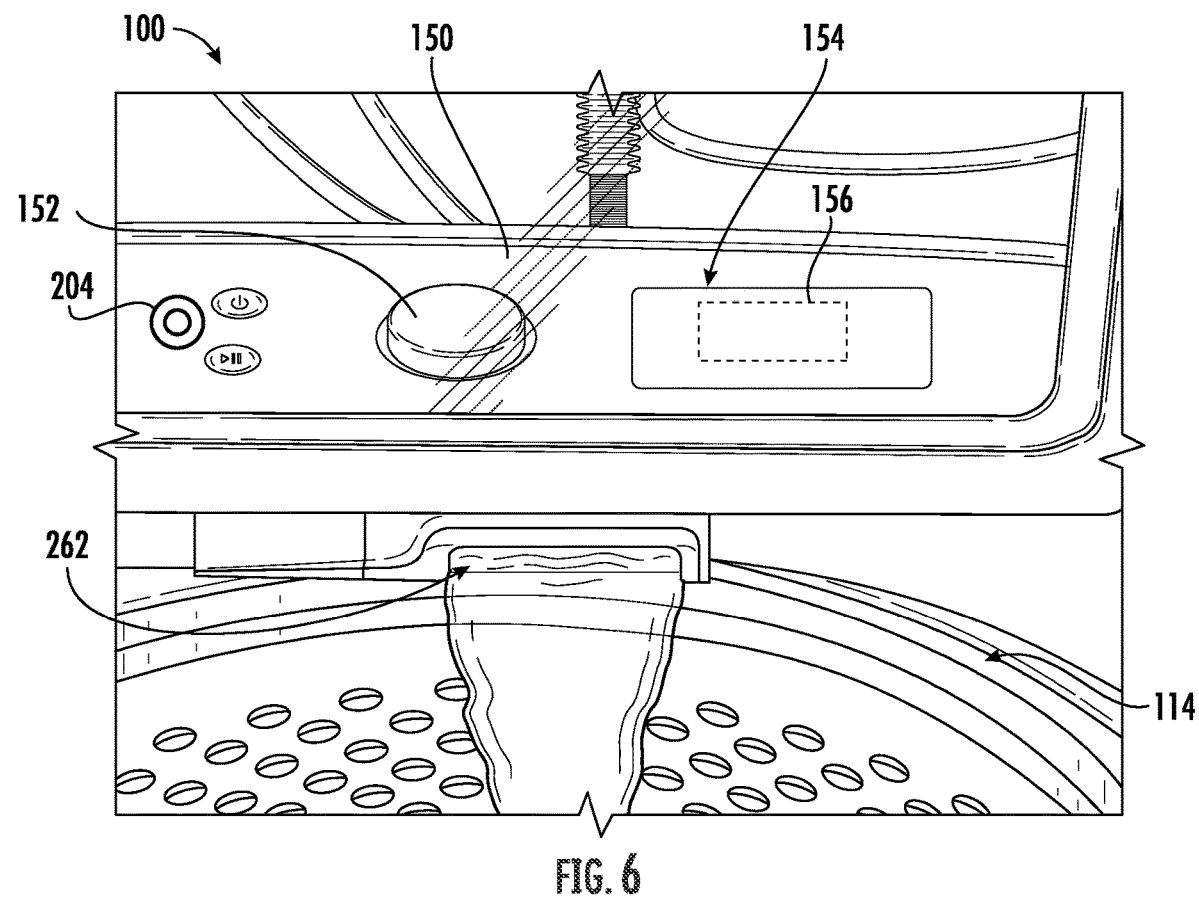
FIG. 6 provides a perspective view of a portion of an embodiment of the appliance in accordance with aspects of the present disclosure.

Referring now to FIG. 4, the washing machine appliance 100 may include a fluid station 262 configured to dispense cold, warm, or hot water, a cleaning agent, or combinations thereof. The fluid station 262 may include any appropriate opening allowing flow of fluid therefrom. In FIGS. 4 and 5, the fluid station 262 is depicted as allowing fluid to dispense into the wash basket 114. However, it should be appreciated that other embodiments may position the fluid station 262 at any appropriate place to allow fluid to dispense into a vessel, a receptacle, or other container.

Figure 7:
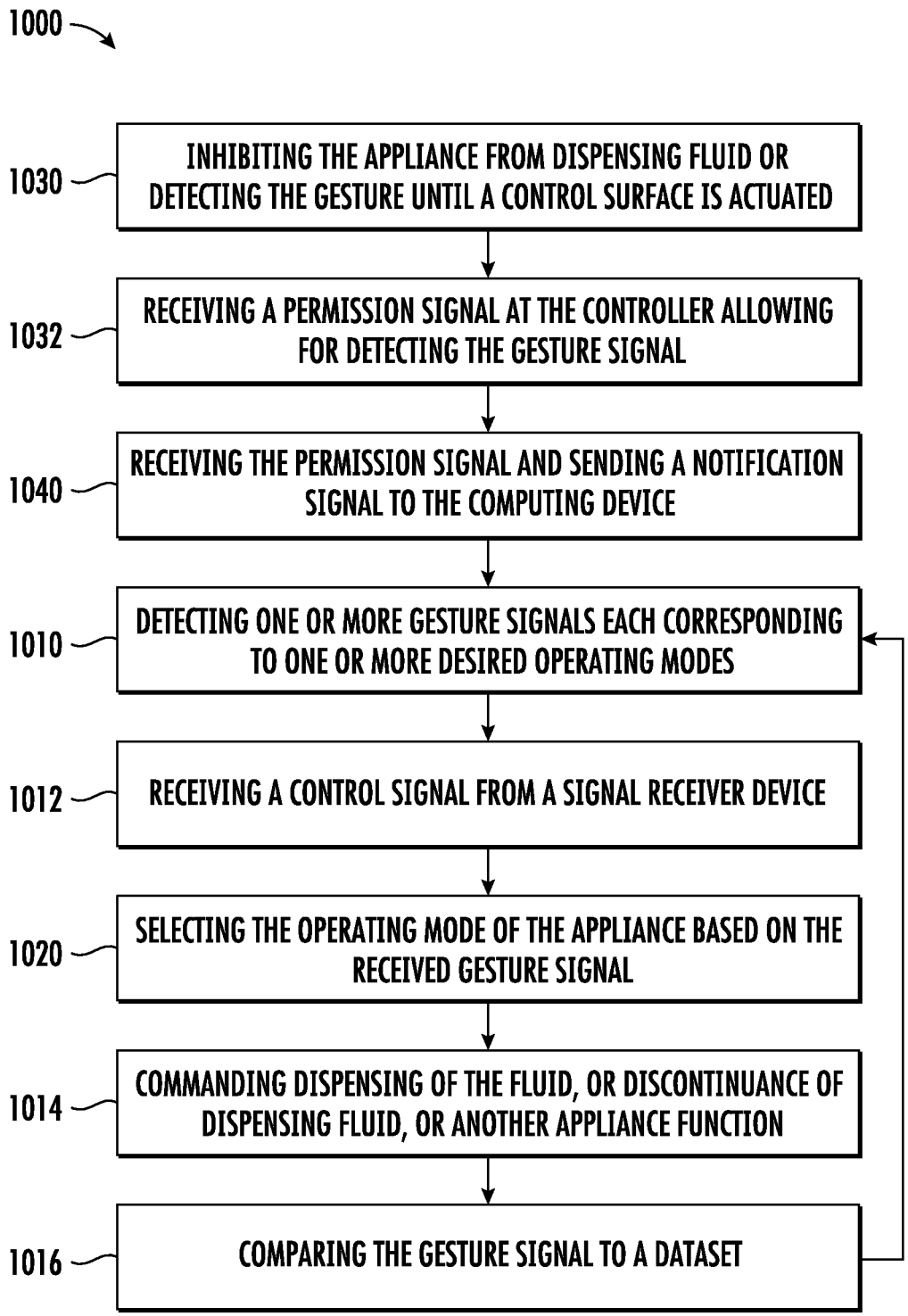
FIG. 7 provides a flowchart depicting exemplary steps of a method for dispensing fluid in accordance with aspects of the present disclosure.

The washing machine appliance 100 may include a device holder 210 configured to retain or mount a computing device 200 onto the washing machine appliance 100. FIG. 5 provides a perspective detailed view of an exemplary device holder 210. The device holder 210 may particularly connect to the top panel 118, the cabinet 102, or other surface of the washing machine appliance 100. The computing device 200 may include any appropriate device having a processor, memory, and communications module. The computing device 200 includes a smartphone device, a tablet device, or other suitable computing system including a signal receiver device 204. The signal receiver device 204 is any appropriate apparatus, such as a camera, microphone, light sensor, or radio sensor, configured to receive gesture signals from a user corresponding to desired operating modes (e.g., each providing a predetermined operation condition, such as cycle duration, rotation speed, rotation patter, fluid-dispensing period, operation variable, etc.). Signal receiver device 180 (FIG. 2) may be configured substantially similarly as described and depicted regarding signal receiver device 204 further described in regard to FIGS. 4 through 5. The signal receiver device 204 is in operable communication with the controller 156 of the washing machine appliance 100. In FIG. 4, the signal receiver device 204 is in operable communication with the controller 156 of the washing machine appliance 100 through a wireless communications bus. Referring to FIG. 7, the signal receiver device 204 may be integrated to the washing machine appliance 100, such as at the top panel 118, the cabinet 102, or other appropriate surface of the washing machine appliance 100. The signal receiver device 204 may be in wired communication with the controller 156 of the washing machine appliance 100. It should be appreciated that in various embodiments, the signal receiver device 204 may be in wired or wireless communication with the controller 156.

Now that the construction of washing machine appliance 100 and the configuration of controller 156 according to exemplary embodiments have been presented, an exemplary method 1000 for dispensing fluid will be described (hereinafter, "method 1000"). Although the discussion below refers to the exemplary method 1000 of operating washing machine appliance 100, one skilled in the art will appreciate that the exemplary method 1000 is applicable to the operation of a variety of other appliances, including fluid dispensing appliances generally, such as refrigeration appliances, or other washing machine appliances, such as horizontal axis washing machine appliances. In exemplary embodiments, the various method steps as disclosed herein may be performed by controller 156. Steps of the method 1000 may be stored as instructions in one or more memory devices associated with the controller 156. Accordingly, the controller 156 or other control device may be configured to perform operations such as provided in one or more steps of the method 1000.

Referring now to FIG. 7, a flowchart outlining exemplary steps of the method 1000 is provided. The method 1000 includes at 1010 detecting, recognizing, or otherwise receiving one or more gesture signals each corresponding to one or more desired operating modes. The signal receiver device (e.g., signal receiver device 204) is configured to receive the gesture signal and send a control signal to the controller (e.g., controller 156) corresponding to one or more operating modes. The method 1000 may include at 1012 receiving, at the controller, the control signal. The method 1000 may include at 1014 commanding a function at the washing machine appliance. The method 1000 at 1014 may include commanding the function based on the control signal received from the signal receiver device. The command may include dispensing of the fluid, such as from the fluid station 262, or discontinuance of dispensing fluid from the fluid station 262, or another appliance function, at the washing machine appliance 100. Other functions at the washing machine appliance 100 may include a command to start a cycle (e.g., wash cycle, rinse cycle, drain cycle) or activate pump assembly 130.

The gesture signal may correspond to any desired or predetermined hand movements, eye movements, head movements, audible signals, or other gestures by a user. The gesture signal may be stored, programmed, or otherwise configured to be detected by the signal receiver device 204 and computing device 200 or controller 156. The gesture signal may correspond to an alphabet or numeral in sign language. The controller 156 or the computing device 200 may be configured to store a dataset, library, or other reference allowing for comparison of the received gesture signal to stored references.

The method 1000 may include at 1016 comparing the gesture signal to a dataset, library, or other reference. The controller 156 or computing device 200 may include a machine learning algorithm configured to receive the gesture from the user and determine the corresponding desired operating mode. The machine learning algorithm may include a deep learning algorithm, a neural network, or other appropriate artificial intelligence algorithm or model for detecting, recognizing, and interpreting visual signals or images. The controller 156 or computing device 200 may receive a predetermined dataset, such as corresponding to a sign language (for example, but not limited to, American Sign Language, Chinese Sign Language, Indo-Pakistani Sign Language, etc.), against which the gesture from the user is compared.

The gesture signal may include a first gesture signal corresponding to dispensing cold water, such as from the fluid station 262. A second gesture signal may correspond to dispensing warm water (i.e., a mixture of cold water and hot water). A third gesture signal may correspond to dispensing hot water. A fourth gesture signal may correspond to dispensing cleaning agent. A fifth gesture signal may correspond to deactivating or stopping dispensing of the cleaning agent. A sixth gesture signal may correspond to deactivating dispensing of water or water/cleaning agent mixture. A seventh gesture signal may correspond to one or more other functions at the appliance, such as, but not limited to, activating a drain or agitating the wash basket 114.

The method 1000 may include at 1020 selecting the operating mode of the appliance based on the received gesture signal, such as described above.

At 1030, the method 1000 may include inhibiting the appliance from dispensing fluid or detecting the gesture until a control surface is actuated. The control surface may include door 120 of the washing machine appliance 100. In one embodiment, the control system and method may include at 1032 receiving a permission signal at the controller 156 allowing for detecting the gesture signal. The permission signal may correspond to the door 120 in an open position (e.g., FIG. 2). The inhibit signal may correspond to door 120 in a closed position (e.g., FIG. 1). In other embodiments, the permission signal may correspond to detection of a vessel, receptacle, or container, at a desired location proximate to a fluid dispenser. The inhibit signal may correspond to non-detection of the vessel, receptacle, or container at the desired location.

At 1040, the method 1000 may include receiving the permission signal and sending a notification signal to the computing device 200. The notification signal may open a graphical user interface (GUI), or prompt a user to open the GUI, at the computing device 200. The GUI may allow for detection, recognition, or receiving the gesture signal via the signal receiver device, such as described at 1010.

Further aspects of the subject matter are provided by one or more of the following clauses:

1. A washing machine appliance, comprising a wash tub positioned within a cabinet; a wash basket rotatably mounted within the wash tub and defining a wash chamber; a fluid station configured to dispense water, cleaning agent, or a combination thereof; a signal receiver device configured to receive signals from a user; a controller operably coupled to the signal receiver device, the controller being configured to detect, via the signal receiver device, a gesture signal corresponding to a desired operating mode of the washing machine appliance; and command a function at the washing machine appliance based on the gesture signal.

2. The washing machine appliance of any one or more clauses herein, the controller being configured to determine the desired operating mode based on the gesture signal.

3. The washing machine appliance of any one or more clauses herein, the controller being configured to compare the gesture signal to a dataset.

4. The washing machine appliance of any one or more clauses herein, wherein the controller being configured to compare the gesture signal to the dataset at the controller comprises a machine learning algorithm configured to detect the gesture signal and correspond to the desired operating mode.

5. The washing machine appliance of any one or more clauses herein, the gesture signal corresponding to a command to start a cycle or activate a pump assembly.

6. The washing machine appliance of any one or more clauses herein, wherein the signal receiver device is an imaging device.

7. The washing machine appliance of any one or more clauses herein, wherein the signal receiver device is a camera, a radar device, a laser device, a sonar device, a microphone, a light sensor, or a radio sensor configured to receive gesture signals from the user.

8. The washing machine appliance of any one or more clauses herein, the controller being configured to select the operating mode of the washing machine appliance based on the detected gesture signal.

9. The washing machine appliance of any one or more clauses herein, the gesture signal corresponding to a command to dispense water.

10. The washing machine appliance of any one or more clauses herein, the gesture signal corresponding to a command to dispense cleaning agent.

11. The washing machine appliance of any one or more clauses herein, the gesture signal corresponding to a command to discontinue dispensing water or cleaning agent.

12. The washing machine appliance of any one or more clauses herein, the controller being configured to inhibit dispensing fluid until a control surface is actuated.

13. The washing machine appliance of any one or more clauses herein, wherein the control surface is a door.

14. The washing machine appliance of any one or more clauses herein, the controller being configured to transmit a permission signal when a door is in open position.

15. The washing machine appliance of any one or more clauses herein, the controller being configured to send a notification signal to a computing device to allow detection of the gesture signal from the user.

16. The washing machine appliance of any one or more clauses herein, wherein the computing device is a smartphone device or a tablet device.

17. A method for dispensing fluid from an appliance, the method comprising detecting, via a signal receiver device, a gesture signal corresponding to a desired operating mode of the appliance; and commanding dispensing or discontinuance of dispensing of fluid from a fluid station based on the gesture signal.

18. The method of any one or more clauses herein, the method comprising determining the desired operating mode based on the gesture signal.

19. The method of any one or more clauses herein, the method comprising comparing the gesture signal to a dataset corresponding to a predetermined signal and corresponding operating mode.

20. The method of any one or more clauses herein, the method comprising selecting the operating mode of the appliance based on the detected gesture signal.

21. An appliance comprising a fluid station configured to dispense water, cleaning agent, or a combination thereof; a signal receiver device configured to receive signals from a user; a controller operably coupled to the signal receiver device, the controller being configured to detect, via the signal receiver device, a gesture signal corresponding to a desired operating mode of the washing machine appliance; and command dispensing or discontinuance of dispensing of fluid from the fluid station based on the gesture signal.

22. The appliance of any one or more clauses herein, the controller being configured to determine the desired operating mode based on the gesture signal.

23. The appliance of any one or more clauses herein, the controller being configured to compare the gesture signal to a dataset at the controller.

24. The appliance of any one or more clauses herein, the controller being configured to compare the gesture signal to the dataset at the controller comprises a machine learning algorithm configured to detect the gesture signal and correspond to the desired operating mode.

25. The appliance of any one or more clauses herein, the gesture signal corresponding to a command to start a cycle or activate a pump assembly.

26. The appliance of any one or more clauses herein, wherein the signal receiver device is an imaging device.

27. The appliance of any one or more clauses herein, wherein the signal receiver device is a camera, microphone, light sensor, or radio sensor configured to receive gesture signals from the user.

28. The appliance of any one or more clauses herein, the controller being configured to select the operating mode of the washing machine appliance based on the detected gesture signal.

29. The appliance of any one or more clauses herein, the gesture signal corresponding to a command to dispense water.

30. The appliance of any one or more clauses herein, the gesture signal corresponding to a command to dispense cleaning agent.

31. The appliance of any one or more clauses herein, the gesture signal corresponding to a command to discontinue dispensing water or cleaning agent.

32. The appliance of any one or more clauses herein, the controller being configured to inhibit dispensing fluid until a control surface is actuated.

33. The appliance of any one or more clauses herein, wherein the control surface is a door.

34. The appliance of any one or more clauses herein, the controller being configured to transmit a permission signal when a door is in open position.

35. The appliance of any one or more clauses herein, the controller being configured to send a notification signal to a computing device to allow detection of the gesture signal from the user.

36. The appliance of any one or more clauses herein, wherein the computing device is a smartphone device or a tablet device.

37. An appliance configured to execute the method of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
   a fluid station configured to dispense water, cleaning agent, or a combination thereof;
   a signal receiver device configured to receive signals from a user;
   a controller operably coupled to the signal receiver device, the controller being configured to:
      inhibit gesture detection at the signal receiver device,
      receive, subsequent to the inhibit gesture detection, a permission signal at the controller corresponding to an open door position for the washing machine appliance,
      permit gesture detection in response to the received permission signal,
      detect, via the signal receiver device, a gesture signal corresponding to a desired operating mode of the washing machine appliance; and
      command a function at the washing machine appliance based on the gesture signal.

2. The washing machine appliance of claim 1, the controller being configured to:
   determine the desired operating mode based on the gesture signal.

3. The washing machine appliance of claim 1, the controller being configured to:
   compare the gesture signal to a dataset.

4. The washing machine appliance of claim 3, wherein the controller being configured to compare the gesture signal to the dataset at the controller comprises a machine learning algorithm configured to detect the gesture signal and correspond to the desired operating mode.

5. The washing machine appliance of claim 1, wherein the signal receiver device is an imaging device configured to detect a hand gesture, an eye movement, a head movement, or other user movement.

6. The washing machine appliance of claim 1, wherein the signal receiver device is a camera, a radar device, a laser device, a sonar device, a microphone, a light sensor, or a radio sensor configured to receive gesture signals from the user.

7. The washing machine appliance of claim 1, the controller being configured to:
   select the operating mode of the washing machine appliance based on the detected gesture signal.

8. The washing machine appliance of claim 1, the gesture signal corresponding to a command to start a cycle or activate a pump assembly.

9. The washing machine appliance of claim 1, the gesture signal corresponding to a command to dispense water.

10. The washing machine appliance of claim 1, the gesture signal corresponding to a command to dispense cleaning agent.

11. The washing machine appliance of claim 1, the gesture signal corresponding to a command to discontinue dispensing water or cleaning agent.

12. The washing machine appliance of claim 1, the controller being configured to:
    inhibit dispensing fluid until a control surface is actuated.

13. The washing machine appliance of claim 1, the controller being configured to:
    transmit a permission signal when a door is in open position.

14. The washing machine appliance of claim 13, the controller being configured to:
    send a notification signal to a computing device to allow detection of the gesture signal from the user.

15. The washing machine appliance of claim 14, wherein the computing device is a smartphone device or a tablet device.

16. A method for dispensing fluid from an appliance comprising a fluid station configured to dispense water, cleaning agent, or a combination thereof, and a signal receiver device configured to receive signals from a user, the method comprising:
    inhibiting gesture detection at the signal receiver device;
    receiving, subsequent to the inhibit gesture detection, a permission signal at a controller corresponding to an open door position for the washing machine appliance;
    permitting gesture detection in response to the received permission signal;
    detecting, via the signal receiver device, a gesture signal corresponding to a desired operating mode of the appliance; and
    commanding a function at the appliance based on the gesture signal.

17. The method of claim 16, wherein the function is dispensing or discontinuing dispensing of fluid from a fluid station at the appliance.

18. The method of claim 16, the method comprising:
    determining the desired operating mode based on the gesture signal.

19. The method of claim 16, the method comprising:
    comparing the gesture signal to a dataset corresponding to a predetermined signal and corresponding operating mode.

20. The method of claim 16, the method comprising:
    selecting the operating mode of the appliance based on the detected gesture signal.

* * * * *